July 12, 1938. D. MARINSKY Re. 20,795

SEPARABLE FASTENER

Original Filed Oct. 22, 1936

INVENTOR
DAVIS MARINSKY
BY
Howard E. Thompson
ATTORNEY

Reissued July 12, 1938

Re. 20,795

UNITED STATES PATENT OFFICE 20,795

SEPARABLE FASTENER

Davis Marinsky, Bronx, N. Y., assignor to Whitehall Patents Corporation, New York, N. Y., a corporation of New York Original No. 2,103,037, dated December 21, 1937, Serial No. 106,962, October 22, 1936. Application for reissue May 14, 1938, Serial No. 207,991

22 Claims. (Cl. 24—205)

This invention relates to what are known as separable fasteners and particularly to devices of this class employing detachably coupled end stops whereby the fastener stringers may be completely separated, thus adapting the device for use on shirts, jackets and similar articles of merchandise; and the object of the invention is to provide means for positively latching or retaining the slider of fasteners of the kind under consideration in connection with one part of a detachable end stop coupling, especially when the stringers are separated so as to facilitate and insure proper recoupling of the end stop parts and stringers; a further object being to provide one part of an end stop with a pivoted hook arm or latching member with tensional means for normally supporting said arm or member in operative position and in engagement with a coupling element on the slider when arranged adjacent said end stop part; a further object being to provide means whereby the insertion of the other of the end stop parts into the first named part will move said member into inoperative position to release the slider; a further object being to provide means for housing or shielding the hook arm or latch member within said end stop part; a further object being to provide a coupling element on the slider arranged within a recessed portion thereof; a still further object being to provide the end stop part and slider with relatively wide abutting surfaces to maintain alinement of said parts when coupled together, facilitating coupling and uncoupling of the end stop parts; and with these and other objects in view, the invention consists in a device of the class and for the purpose specified, which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which.

Figure 1:
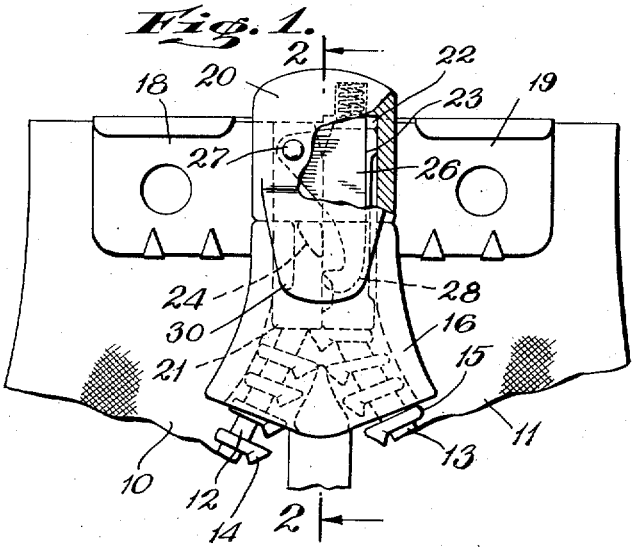
Fig. 1 is a plan and sectional view of one end portion of a separable fastener.

In the drawing, I have indicated at 10 and 11 one end portion of the tapes of the stringers of a separable fastener, to the adjacent beaded edges 12, 13 of which are attached the coupling links or scoops 14 and 15 which are adapted to be coupled and uncoupled by a slider 16 movable longitudinally of the stringers as in other devices of this kind. The slider is provided with a finger piece or pull 17 by means of which the same may be operated. At 18 and 19, I have shown reinforcing strips or sheets secured to the ends and adjacent edges of the tapes 10 and 11 to reinforce the same, and as the specific structure of these reinforcements is old, no specific description is necessary here.

At 20, I have shown one part of a detachable end stop structure, said part being in the form of a U-shaped or substantially U-shaped body permanently secured to the part 10 and including a projecting bar portion 21 at one side thereof. The other side of the part 20 has a channel 22 for receiving the pin part 23 of the end stop. The part 23 is secured to the beaded edge 13 of the stringer tape 11, it being understood that the bar 21 is secured to the corresponding edge of the tape 10.

Figure 2:
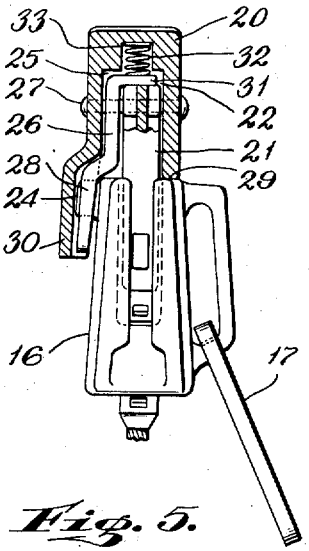
Fig. 2 is a section substantially on the line 2—2 of Fig. 1, with one of the stringers removed and showing the slider in elevation.
Figure 3:
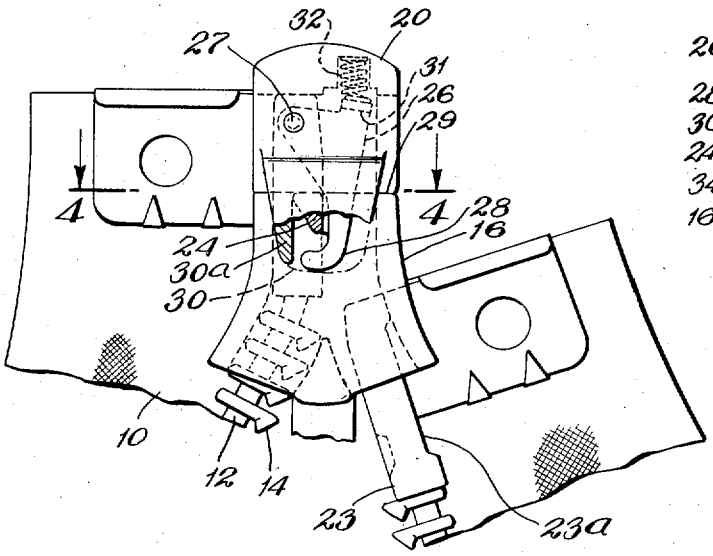
Fig. 3 is a view similar to Fig. 1 showing the parts in a different position.

In the construction shown in Figs. 1 to 3 inclusive, the slider 16 is provided on one side surface, the rear surface in the construction shown, with a projecting lug or latch element 24 and the part 20 is recessed as seen at 25 to receive a coupling pawl or latch member 26 which is pivoted to the part 20 on the pin 27, said member having an outwardly projecting hook portion 28 adapted to cooperate with the lug 24 as seen in Fig. 3 of the drawing to couple the slider 16 with the part 20 and in supporting adjacent surfaces of the slider and part 20 in abutting relation as seen at 29 in said figure. The part 20 includes an outwardly projecting hood or housing portion 30 arranged over the hook-shaped end 28 of the member 26 to guard and protect said member as well as to render the same substantially invisible.

The rear end portion of the member 26 has an inwardly offset flange 31 which extends into the channel 22 of the part 20 so as to be engaged by the pin 23 when inserted in said channel. A coil spring 32 is mounted in a socket 33 formed in the part 20 and bears against the flange 21 to normally urge the hook end 28 of the member 26 into the position indicated in Fig. 3 of the drawing and said member is movable into inoperative position by engagement of the pin 23 with the flange 31 to depress the spring 32 in the manner illustrated in Fig. 1 of the drawing, in which position of the member 26, the slider 16 is free to move out of engagement with the part 20 and longitudinally of the stringers to couple the links thereof. With this construction, until the pin part 23 of the detachable end stop coupling is in proper position within the part 20, it will be impossible to operate the slider 16, or, in other words, to disengage the slider from the part 20. Thus, it will be impossible to jam or otherwise improperly couple the fastener stringers, thereby overcoming a great objectionable feature and difficulty with detachable end stops for separable fasteners as heretofore commonly employed.

Figure 5:
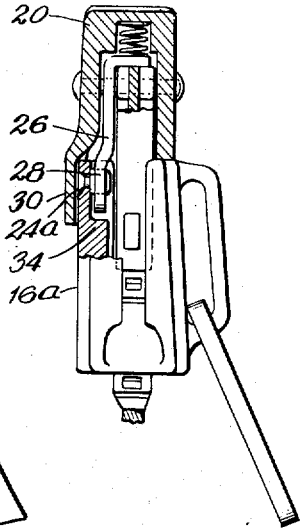
Fig. 5 is a view similar to Fig. 2 with part of the slider shown in section and showing a modification.

In Fig. 5 of the drawing, I have shown a slight modification which consists primarily in changing the structure of the slider **16*a* by providing a recess 34 in the inner end of the rear wall or plate thereof, and in arranging the projection 24*a* in said recess rather than as a protruding body upon the outer surface of the slider as in Figs. 1 to 3 inclusive. Thus, with this arrangement of the coupling 24*a*, the member 26 including the hook end 28 thereof will simply have a slighter offset than with the structure shown in the other figures. In like manner, the hood 30 will not protrude on the part 20 to such a great degree as shown in the other figures. Otherwise, the structure and method of operation of the respective parts will be the same as that shown in Figs. 1 to 3 inclusive. In this connection, it will be understood that the part 20** may be constructed in any desired manner and of any suitable design consistent with or suitable for use with sliders of different constructions. In like manner, the form and construction of the coupling or latching means employed on the respective parts may be modified or changed to be consistent with the structural changes of said parts.

The fundamental principle of my invention resides in the provision of interengaging coupling or latching elements brought into operative engagement with each other when the slider is arranged adjacent the end stop and when one part of the end stop is detached in the separation of the stringers and in maintaining the slider and said first named end stop part against relative movement until the second named end stop part has been recoupled and brought into properly alined position, at which time, the coupling means is released, facilitating movement of the slider in coupling the stringer links. In this connection, it is desirable to employ a coupling or latching means which is positive in operation and wherein a pull upon the slider will not permit forcible detachment of the slider from the end stop, it being understood that the strength of this coupling depends entirely upon the strength of the parts, but no normal manual pull or strain would be sufficient to brake the coupling parts employed. In other words, the couplings 24—28 form a rigid non-yielding connection between the end stop and the slider, the coupling elements 24—28 being composed of rigid or firm material and the element 26—28 forming in fact a solid coupling link between its pivot 27 and the element 24.

In these respects, the structure herein disclosed differentiates from the structure disclosed in a companion application Serial Number 106,921 filed of equal date herewith as well as from the structure disclosed in an earlier application, Serial Number 78,604, filed by me May 8, 1936.

Figure 4:
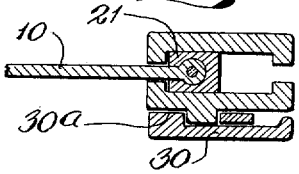
Fig. 4 is a partial section on the line 4—4 of Fig. 3.

From a consideration of Figs. 3 and 4 of the drawing, it will also be apparent that the projecting hood portion 30 which covers the hook end 28 of the link or latch member 26 is provided with a side wall portion **30*a* which is adapted to engage the lug 24 to prevent lateral displacement of the slider, especially when the pin 23 is detached, the wall 30*a* preventing movement of the slider in one transverse direction and the bar 21 preventing movement in the opposite direction. With this construction, the proper alinement of the lug 24 with the hook end 28 is assured and maintained. Normally, the lug 24 is arranged in spaced relation to the hook end 28, and by providing this spacing or clearance, the locking or latching of the slider with the end stop may be assured, even though the slider is disposed in spaced relation to the end stop. It is also preferred that the pin part 23 be provided with a recessed inner side 23*a*** intermediate the ends thereof so as to provide a freer passage of the pin part through the curved socket of the slider in the operation of coupling and uncoupling the stringers.

Having fully described my invention what I claim as new and desire to secure by Letters Patent, is:—

1. In separable fasteners employing stringers and a slider movable longitudinally of the stringers to couple and uncouple the same and an end stop coupling one end of the stringers, means involving coupling elements composed of rigid material on said end stop and slider for positively and detachably coupling the slider with said end stop to prevent separation of said parts when in juxtaposition to each other, and said coupling elements being concealed within and between the end stop and slider when coupled together.

2. In separable fasteners employing stringers and a slider movable longitudinally of the stringers to couple and uncouple the same and an end stop coupling one end of the stringers, means involving coupling elements composed of rigid material on said end stop and slider for positively and detachably coupling the slider with said end stop to prevent separation of said parts when in juxtaposition to each other, said coupling elements being concealed within and between the end stop and slider when coupled together, one of said couplings being movable on its support, and means insertable into the end stop and cooperating with said movable element to move the same into inoperative position to permit separation of said parts.

3. In separable fasteners employing stringers and a slider movable longitudinally of the stringers to couple and uncouple the same and an end stop coupling one end of the stringers, means involving coupling elements composed of rigid material on said end stop and slider for positively and detachably coupling the slider with said end stop to prevent separation of said parts when in juxtaposition to each other, said coupling elements being concealed within and between the end stop and slider when coupled together, one of said couplings being movable on its support, means insertable into the end stop and cooperating with said movable element to move the same into inoperative position to permit separation of said parts, and a spring cooperating with said movable element to normally move the same into operative position.

4. The combination with the end stop of separable fasteners employing stringers and a slider movable longitudinally of the stringers to couple and uncouple the same, of a coupling member composed of rigid material, said coupling member being disposed and concealed within said end stop, means for movably supporting said member in connection with said end stop to provide movement thereof into operative and inoperative positions to permit coupling and uncoupling of the slider with said end stop, and said slider having a coupling element engaged by the coupling member of said end stop.

5. The combination with the end stop of separable fasteners employing stringers and a slider movable longitudinally of the stringers to couple and uncouple the same, of a coupling member composed of rigid material, means for movably supporting said member in connection with said end stop to provide movement thereof into operative and inoperative positions to permit coupling and uncoupling of the slider with said end stop, said slider having a coupling element engaged by the coupling member of said end stop, said coupling member projecting beyond a stop wall of said end stop engaged by said slider, and means on the end stop for covering the projecting portion of said member.

6. In separable fasteners employing stringers with interengaging links thereon and a slider movable longitudinally of said stringers to cause engagement and disengagement of said links, end stops at the ends of said stringers, cooperating elements on said end stops adapted to engage and to hold the stops against movement away from each other transversely of the stringers, means within one of said stops and non-exposed through outer side surfaces of said stop and adapted to engage said slider in coupling the slider with said stop, and means cooperating with said first named means to unlock said slider by engagement of said cooperating elements.

7. In separable fasteners employing stringers with interengaging links thereon and a slider movable longitudinally of said stringers to cause engagement and disengagement of said links, end stops at the ends of said stringers, cooperating elements on said end stops adapted to engage and to hold the stops against movement away from each other transversely of the stringers, means on one of said stops to lock said slider thereto, means to unlock said slider by engagement of said cooperating elements, and means preventing unlocking of said slider except by said engagement of said cooperating elements.

8. In separable fasteners employing stringers with interengaging links thereon and a slider movable longitudinally of said stringers to cause engagement and disengagement of said links, end stops at the ends of said stringers, one of said stops having a socket and the other having a pin receivable in said socket to hold the stops against movement away from each other transversely of the stringers, said pin being insertable in said socket through said slider, means housed and concealed within the socket of the end stop to lock said slider to said end stop, and a projection on said first named means extending into the socket and adapted to be engaged by said pin when inserted into the socket through the slider to disengage the first named means from the slider to release the same.

9. In separable fasteners employing stringers with interengaging links thereon and a slider movable longitudinally of said stringers to cause engagement and disengagement of said links, end stops at the ends of said stringers, one of said stops having a socket and the other having a pin receivable in said socket to hold the stops against movement away from each other transversely of the stringers, said pin being insertable in said socket through said slider, means to lock said slider to the end stop having the socket, means to unlock said slider by insertion of said pin through the slider and into said socket, and means preventing unlocking of the slider except by insertion of said pin.

10. An end stop for separable fastener stringers of the class described, said end stop comprising detachably coupled parts secured to the respective stringers permitting coupling and uncoupling of the stringers at one end thereof, one of said parts having a channel extending from one side edge of the stringer to which it is attached, the other part having a pin portion insertable into the channel of the first named part in coupling said parts together, said first named part having a pivoted coupling link arranged and concealed therein for coupling the slider against separation from said part, and means on said link exposed to the channel of said first named part and adapted to be engaged by said pin part to control the movement of said link into operative and inoperative positions.

11. An end stop for separable fastener stringers of the class described, said end stop comprising detachably coupled parts secured to the respective stringers permitting coupling and uncoupling of the stringers at one end thereof, one of said parts having a channel extending from one side edge of the stringer to which it is attached, the other part having a pin portion insertable into the channel of the first named part in coupling said parts together, said first named part having a pivoted coupling link for coupling the slider against separation from said part, means on said link exposed to the channel of said first named part and adapted to be engaged by said pin part to control the movement of said link into operative and inoperative positions, and means on said first named part cooperating with the link to move the same into operative position when the pin part is detached.

12. The combination with separable fasteners employing stringers with a slider movable along the stringers to couple and uncouple the same and an end stop involving detachably coupled parts at one end of the stringers for coupling said stringer ends, of means concealed within and between the end stop and slider for securely retaining the slider against movement longitudinally of one of the stringers and against detachment from the end stop part secured to said stringer when the end stop parts are separated.

13. The combination with separable fasteners employing stringers with a slider movable along the stringers to couple and uncouple the same and an end stop involving detachably coupled parts at one end of the stringers for coupling said stringer ends, of means for securely retaining the slider against movement longitudinally of one of the stringers and against detachment from the end stop part secured to said stringer when the end stop parts are separated, said means comprising a link of rigid material movably supported and housed within said end stop and engaging a coupling element on said slider when moved within a part of said end stop.

14. The combination with an end stop on a separable fastener stringer and a slider movable longitudinally of the stringer toward and from said end stop, of means comprising interengaging coupling members on said end stop and slider for positively coupling and latching the slider to said end stop to prevent separation therefrom, one of said coupling members comprising a pivoted link having a hook end portion, said link member being arranged and housed within the end stop, and the other member comprising a part on the slider adapted to be arranged within a part of the end stop and to be engaged by the hook end of said link.

15. The combination with an end stop on a separable fastener stringer and a slider movable longitudinally of the stringer toward and from said end stop, of means comprising interengaging coupling members on said end stop and slider for positively coupling and latching the slider to said end stop to prevent separation therefrom, one of said coupling members comprising a pivoted link having a hook end portion, said link member being arranged and housed within the end stop, and the other member comprising a part on the slider adapted to be arranged within a part of the end stop and to be engaged by the hook end of said link, and means involving a projection on said link within said end stop for moving the hook end thereof into positions to disengage the second named coupling member to permit separation of said end stop and slider.

16. The combination with an end stop on a separable fastener stringer and a slider movable longitudinally of the stringer toward and from said end stop, of means comprising interengaging coupling members on said end stop and slider for positively coupling and latching the slider to said end stop to prevent separation therefrom, one of said coupling members comprising a pivoted link having a hook end portion, said link member being arranged and housed within the end stop, and the other member comprising a part on the slider adapted to be arranged within a part of the end stop and to be engaged by the hook end of said link, means involving a projection on said link within said end stop for moving the hook end thereof into positions to disengage the second named coupling member to permit separation of said end stop and slider, and means for moving said link into operative position.

17. In separable fasteners employing stringers and a slider movable longitudinally of the stringers, an end stop at one end of one stringer limiting the movement of the slider in one direction on the stringer, said end stop comprising a channelled body with the channel opening through the inner end of said body, a latching link pivotally mounted within the channel of said body and exposed for engagement through the open end of said body to engage the slider when the latter is moved into juxtaposition to said end stop, and means on the slider disposed within part of said end stop adapted to be engaged by said link in positively retaining the slider against detachment from the end stop in one position of said link.

18. In separable fasteners employing stringers and a slider movable longitudinally of the stringers, an end stop at one end of one stringer limiting the movement of the slider in one direction on the stringer, a latching link pivoted to said end stop and projecting therefrom into position to engage the slider when the latter is moved into juxtaposition to said stop, means on the slider engaged by said link to positively retain the slider against detachment from the end stop in one position of said link, and means on said end stop adapted to project over the slider for covering and protecting said link.

19. In separable fasteners employing stringers and a slider movable longitudinally of the stringers, an end stop at one end of one stringer limiting the movement of the slider in one direction on the stringer, said end stop comprising a channelled body with the channel opening through the inner end of said body, a latching link pivotally mounted within the channel of said body and exposed for engagement through the open end of said body to engage the slider when the latter is moved into juxtaposition to said end stop, means on the slider disposed within part of said end stop adapted to be engaged by said link in positively retaining the slider against detachment from the end stop in one position of said link, and means involving a member insertable into and out of the channel of said end stop body and cooperating with said link in controlling the movement of said link to latch and unlatch the same with respect to said slider.

20. In separable fasteners employing stringers and a slider movable longitudinally of the stringers, an end stop at one end of one stringer limiting the movement of the slider in one direction on the stringer, said end stop comprising a channelled body with the channel opening through the inner end of said body, a latching link pivotally mounted within the channel of said body and exposed for engagement through the open end of said body to engage the slider when the latter is moved into juxtaposition to said end stop, means on the slider disposed within part of said end stop adapted to be engaged by said link in positively retaining the slider against detachment from the end stop in one position of said link, and interengaging means on the end stop and slider for preventing lateral movement of the slider with respect to said end stop.

21. The combination with separable fasteners employing stringers with a slider movable along the stringers to couple and uncouple the same and an end stop involving detachably coupled parts at one end of the stringers for coupling said stringer ends, of means housed and concealed within the end stop part of one stringer for securely retaining the slider against detachment from said end stop part when said end stop parts are separated, and means for preventing lateral displacement of the slider with respect to said first named end stop to maintain alinement of said part and slider.

22. In a separable fastener comprising two rows of interengaging elements adapted to be interlocked by a slider member, a detachably coupled end stop at one end of said rows of interengaging elements, said end stop comprising a socket member attached to one of said rows of interengaging members, a stiffened portion on the second row adapted to be inserted in said socket member to detachably couple said two rows together, means housed within said socket member for detachably fastening said end stop and slider together, and further means whereby the insertion of said stiffened portion into the socket member will release engagement of the first named means with said slider.

DAVIS MARINSKY.